United States Patent [19]
Putz

[11] Patent Number: 5,628,419
[45] Date of Patent: May 13, 1997

[54] ELECTRICAL BOX WITH QUICK-MOUNT CLAWS AND PULL STRAPS

[76] Inventor: Georg Putz, Waldhof 24, A-5441 Abtenau, Austria

[21] Appl. No.: 642,565

[22] Filed: Apr. 8, 1996

Related U.S. Application Data

[63] Continuation of PCT/AT95/00209, Oct. 10, 1995

[30] Foreign Application Priority Data

Nov. 4, 1994 [AU] Australia ................. A2052/94

[51] Int. Cl.⁶ ..................................... H02G 3/00
[52] U.S. Cl. .................. 220/3.3; 220/3.7; 220/3.9
[58] Field of Search ............... 220/3.3, 3.4, 3.8, 220/3.9, 3.7

[56] References Cited

U.S. PATENT DOCUMENTS

| | | |
|---|---|---|
| 3,659,036 | 4/1972 | Silver .......................... 220/3.3 |
| 4,044,909 | 8/1977 | Amsler et al. . |
| 4,135,337 | 1/1979 | Medlin . |
| 4,296,870 | 10/1981 | Balkwill et al. ............ 220/3.3 |
| 4,673,097 | 6/1987 | Schuldt . |
| 5,180,074 | 1/1993 | Bowman et al. ............ 220/3.3 |

Primary Examiner—Joseph Moy
Attorney, Agent, or Firm—Herbert L. Lerner; Laurence A. Greenberg; Werner H. Stemer

[57] ABSTRACT

An electrical box for mounting particularly in hollow walls has claws attached at pull straps. The straps are shiftably guided in the axial direction of the box in guides thereof. Each strap has a serrated toothing which cooperates with a counter toothing at a springy tongue of the guide. The box can thereby be securely mounted by manually pulling the pull straps and thus clamping the claws behind the wall.

13 Claims, 2 Drawing Sheets

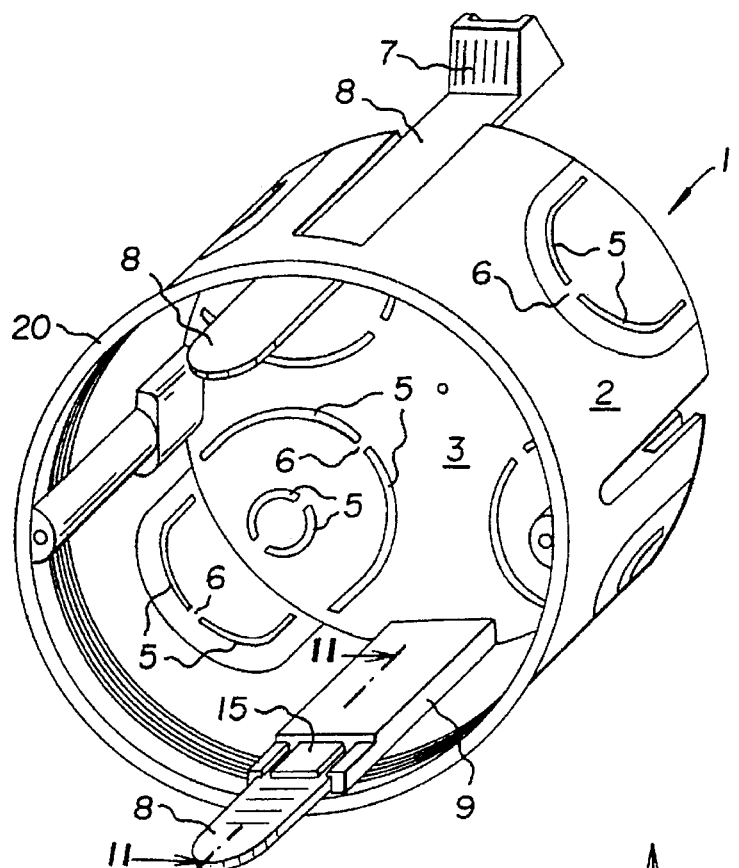
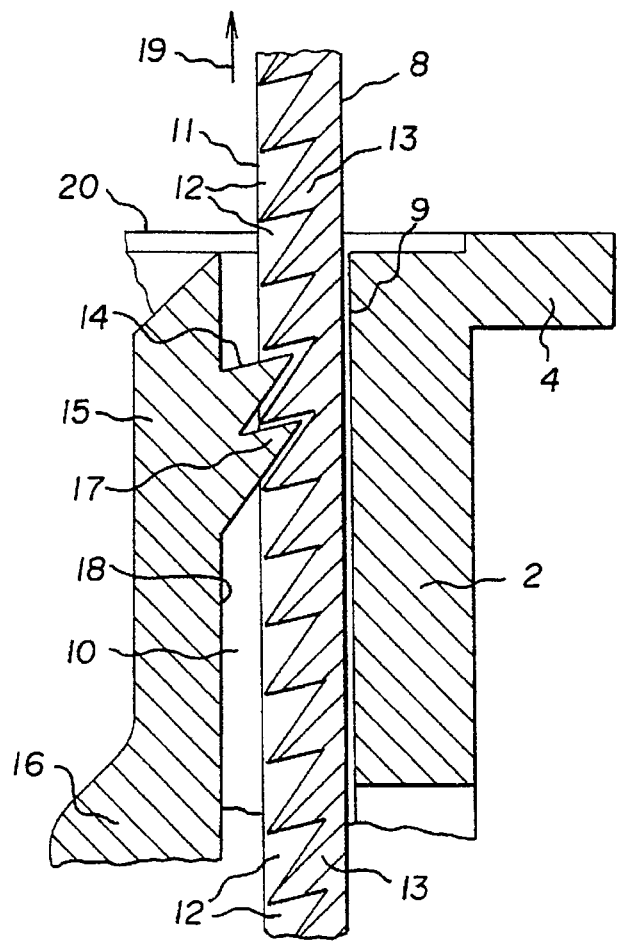
Fig. 1
Fig. 2

5,628,419

ELECTRICAL BOX WITH QUICK-MOUNT CLAWS AND PULL STRAPS

CROSS-REFERENCE TO RELATED APPLICATION

This application is a continuation of international application Ser. No. PCT/AT95/00209, filed Oct. 10, 1995.

BACKGROUND OF THE INVENTION

1. Field of the Invention

The invention relates to an electrical installation box for flush mounting in walls, in particular in hollow walls. The box has claws which are movable relative to the box and with which the box is secured in an opening formed in the wall. Each claw is attached at a pull strap, which is slidably guided along the axial direction of the box (perpendicularly to the wall surface) in a guide of the box. The pull strap is formed with which a serration and there is an associated counter toothing formed on the box.

It is well known that it is often difficult to rigidly attach electrical boxes (for switches, outlets, sockets, etc.), in an opening in a wall and, particularly, if it is a hollow wall, as it is often the case with sheetrock or wooden walls. Conventional boxes for such applications have metal claws that can each be tightened by means of a screw held in the box. The mounting time necessary therefor is substantial and the production costs for such boxes are relatively high.

2. Description of the Related Art

Electrical installation boxes of the above-mentioned kind have therefore been developed (for example German patent DE-A 2 137 299 and French patent FR-A 2 147 029) in which the box is attached in the wall opening by pulling pull straps in the axial direction of the box. When the pull strap is pulled out of the box, the teeth of the pull strap glide over the teeth of the counter toothing until the claws come to lie on the edge of the wall opening in which the box is to be mounted. When the desired end position is reached, then the counter toothing which has snapped into the toothing of the pull strap holds the pull strap in the adjusted position. The result is a secure anchoring of the box in the wall opening.

It has proved disadvantageous, however, that the tightening of the pull straps is cumbersome, as it can be done only with heavy pliers. Those prior art structures have therefore not been successful in practical application.

SUMMARY OF THE INVENTION

It is accordingly an object of the invention to provide an electrical box with quick-mount claws and pull straps, which overcomes the above-mentioned disadvantages of the prior art devices and methods of this general type. The novel installation box is to combine the advantages of both above-noted prior art boxes: the pull strap box is to be improved such that the mounting of the box is simplified, while a secure seating of the box in the wall opening is assured. As compared to the conventional box with the screw mounting, the novel structure is to provide for substantial savings in mounting time and production costs.

With the foregoing and other objects in view there is provided, in accordance with the invention, an electrical box assembly for mounting in walls, comprising:

a box defining an interior for receiving an electrical appliance and defining an axial direction thereof, the box having sidewalls and guides extending along the sidewalls in the axial direction;

a plurality of pull straps each shiftably guided in a respective one of the guides along the axial direction of the box, each of the pull straps carrying a claw for clamping the box in the wall; and each of the pull straps being formed with toothing and each of the guides being formed with counter toothing cooperating with the toothing of the pull straps, and each of the guides including a springy tongue carrying the counter toothing.

In other words, the invention is found in that the counter-toothing is provided on a springy tongue of the guide. That springy tongue makes it possible to pull the pull straps in axial direction for the attaching the box without a great expenditure in force. As before, the teeth of the pull strap serration glide over the teeth of the counter toothing; however, the tongue now is deflected in a springy fashion and it thereby allows easy shifting of the pull strap, yet it tightly holds the pull strap in the adjusted position. The box can be mounted quickly and the manufacturing costs for the box provided with a guide with such a springy tongue are small.

Normally, removing of the box from the wall opening is not taken into consideration. Should it be necessary to remove the box, however, then the structure of the invention allows such removal in a simple fashion. The springy tongue is thereby pushed back by means of a tool, such as a screwdriver. The strap is thus released, the pull strap is pushed back into the box, and the box comes free.

In accordance with an added feature of the invention, each of the springy tongues is formed by an inner wall portion of a respective guide. Preferably, the inner wall portion forming the springy tongue is integrally formed in one piece with the guide. This lowers the production costs. And an integral one-piece configuration is easily formed with the entire box of plastic, in particular by injection molding. In that case, also, the inner wall portion of the guide forming the springy tongue has a reduced wall thickness as compared with a remaining inner wall of the guide. The spring function of the device is thus assured.

In accordance with an additional feature of the invention, the springy tongue is disposed at an end of the guide which neighbors the open face edge of the box. Also, the guide is formed with slits extending in the axial direction, and the springy tongue is a tab which extends in the axial direction, which is separated from neighboring wall portions of the guide by the slits, and which merges into the guide at an end thereof facing away from the open face of the box.

In accordance with further features of the invention, the toothing of the pull straps comprises teeth which are inclined away from an open face of the box, and the counter toothing comprises teeth which are inclined towards the open face of the box. Particularly secure anchoring of the box in its mounted position results from such tooth inclination. Also this embodiment aids in the pulling out of the pull strap.

Preferably, the toothing on the pull strap is a row of a multiplicity of teeth, and the counter toothing is formed by fewer teeth than the toothing on the pull strap, for instance by two teeth. This provides for several advantages, particularly with regard to manufacturing cost reduction. The length of the row of teeth is hereby chosen such that all eligible walls can be handled with regard to the respective wall thickness.

The teeth on the springy tongue preferably project from a surface of the tongue. This is also advantageous for reasons of manufacture. The teeth of the pull strap, on the other hand, can be embedded in the pull strap material.

The pull straps are usually relatively long so that a sufficient adjustment path length is provided which allows the adaptation to a great range of wall thicknesses. After the pull straps have been pulled and the box is thereby effectively attached in the wall opening, the protruding ends of the pull straps can be cut off; this is possible without a problem when the pull straps are tear-safe plastic bands. It is nevertheless conceivable that the springy tongue is damaged when the protruding pull strap ends are cut off. This can be avoided in accordance with a concomitant feature of the invention, in which the pull straps are formed of soft bendable material, and the box has a bottom formed with push-through openings for receiving a folded-back end of each Pull strap. In that case, the pull straps are formed of a tear-resistant plastic band. Finally, each of the push-through openings is formed immediately adjacent a respectively associated one of the guides. The ends of the pull straps need no longer be severed after the pull straps have been pulled, but instead they are bent back and pushed through the through opening in the bottom of the box. This means a further savings in mounting time. It is hereby suitable for each through opening to be directly adjacent the associated guide so as not to lose space in the box for the switch or the like which is to be mounted in the box.

Other features which are considered as characteristic for the invention are set forth in the appended claims. Although the invention is illustrated and described herein as embodied in an electrical box with quick-mount claws and pull straps, it is nevertheless not intended to be limited to the details shown, since various modifications and structural changes may be made therein without departing from the spirit of the invention and within the scope and range of equivalents of the claims. It is particularly noted that the preferred embodiment illustrated herein is a cylindrical version, as it is conventional in the European and other overseas markets. An alteration of the round version to the rectangular embodiment, which is more conventional in the North American market, is clearly within the scope of this invention. Further, any number of pull straps with claws may be provided on each box, so as to assure satisfactory mounting forces.

The construction of the invention, however, together with additional objects and advantages thereof will be best understood from the following description of the specific embodiment when read in connection with the accompanying drawings.

BRIEF DESCRIPTION OF THE DRAWING

FIG. 1 is a perspective view of a first embodiment of the invention;

FIG. 2 is a sectional view taken along the line II—II of FIG. 1 through an enlarged detail thereof;

DESCRIPTION OF THE PREFERRED EMBODIMENTS

Figure 3:
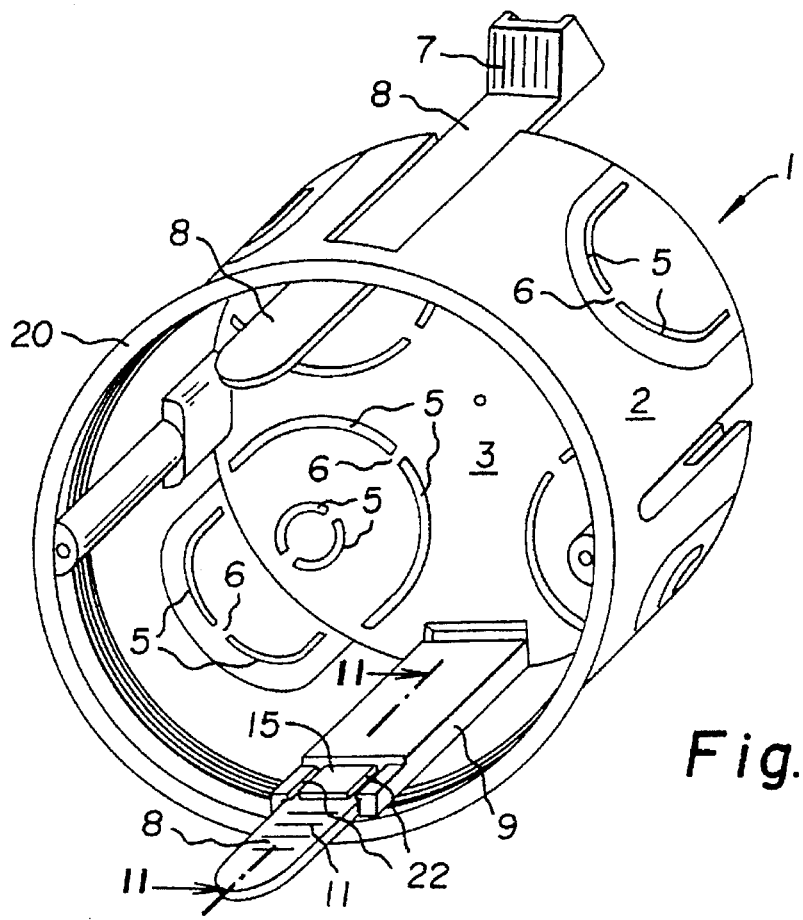
FIG. 3 is a perspective view of a second embodiment of the box prior to bending back the ends of the pull strap.

Referring now to the figures of the drawing in detail and first, particularly, to FIGS. 1 and 2 thereof, there is seen a box 1 for receiving electrical installation assemblies, such a switches, sockets, and the like. The box 1 has an essentially circular wall 2, which is closed off at one face end with a bottom 3 and which is open at its other face end. The box 1 can be attached in a conventional manner in an opening in a wall, in particular a hollow wall. The opening should thereby have an essentially circular cross-section and a diameter which corresponds to that of the box 1. The box 1 is provided with a circular flange 4 at is open face end. The flange 4 is a push-in stop which limits the insertion of the box 1 in the hollow wall.

Conventional pushout tabs are provided in the box body. The wall 2 and the bottom 3 are formed with slits 5 which bound the tabs. They are attached to the rest of the wall 2 and the bottom 3 via planned breakage points which allow simple pushout of the tabs for cables and the like.

The box 1 is attached in the hollow wall with claws 7, each attached at an end of a respective pull strap 8. The pull straps 8 and the box 1 are formed of plastic which, in the case of the pull straps 8, is suitably bendable and highly tear-resistant. Each pull strap 8 is slidably guided along the axial direction of the box in a guide 9. Each guide 9 is disposed at the inner wall surface of the wall 2 of the box 1, it extends in the axial direction of the box 1, and it is integrally formed in one piece with the box 1. The box is preferably injection molded.

Each guide 9 defines a hollow space 10 (FIG. 2) with a rectangular cross section and which is open at each of its ends. The pull strap 8, the basic cross section of which is also rectangular, is guided in the hollow space 10 with sufficient play (except for the toothing which will be described in the following), such that the pull strap 8 can be easily pulled in axial direction out of the box 1.

The above-mentioned toothing 11 (FIG. 2) is formed on the pull strap 8 in the form of a long row of teeth formed by indentations 12 in the plastic material in the pull strap 8 in the form of a serration. Teeth 13 are respectively bounded by two mutually adjacent indentations 12 and they are inclined towards the bottom 3 of the box 1. The serration 11 cooperates with a counter toothing 14 (FIG. 2) provided on a springy tongue 15 of the guide 9. The springy tongue 15 is formed by an inner wall portion of the guide 9 which is integrally formed with the remaining guide 9, but which has a reduced wall thickness (FIG. 2) relative to the remaining inner wall portion 16. The wall portion forming the tongue 15 extends as a tab (lobe) in the axial direction of the guide 9, i.e. in the direction which coincides with the longitudinal direction of the pull strap 8. The tab forming the springy tongue 15 is separated from the neighboring wall portions of the guide 9 by two slits 22 (FIG. 1) in the axial direction of the guide 9. The tongue 15 formed by the tab merges integrally into the wall of the guide 9 at its end which points away from the open face of the box 1.

Instead of the integral one-piece construction of the springy tongue with the remaining guide 9, it is also possible to embody the springy tongue as an embedded metal strip; the above-described, one-piece construction, however, is more advantageous for manufacturing reasons.

The counter toothing 14 has only two teeth 17 which project from a surface 18 of the tongue and which are inclined away from the bottom 3 and towards the open end of the box 1. The shape of the teeth 17 suitably corresponds to that of the toothing 11, so as to ensure a solid engagement of the counter toothing 14 in the toothing 11. The above-noted inclination of the teeth and the springy embodiment of the tongue 15 has the effect that the pull strap 8 can be easily pulled out of the box 1 in the direction of the arrow 19 (FIG. 2), whereby for each tooth 13 of the toothing 11 the springy tongue 15 is slightly bent back and its teeth 17 glide over the teeth 13 of the toothing 11 and then snap into the indentations 12 one after the other. This continues until the claws 7 come to lie at the rearward wall surface of the hollow wall and thus clamp the box 1 in the opening of the hollow wall.

The flange 4 prevents the box 1 from being pulled into the wall. If it is not a hollow wall, but instead a solid wall, in which the box 1 is to be mounted, then the claws 7 are suitably formed as wedges which, upon pulling the pull strap 8, are pulled into the annular gap between the annular wall surface of the opening and the outer surface of the wall 2 of the box 1 and they clamp the box 1. The pull straps 8 may be pulled out by hand during mounting, or it may even be simpler to pull them by means of pliers.

The springy tongue with its teeth 17 can be manufactured together with the box 1 without a problem. This is further simplified in that the tongue 15 is disposed at the end of the guide 9 which neighbors the edge 20 around the open face of the box 1.

The springy character of the tongue 15 enables the easy removal of the box, if desired. It is thereby only necessary to push the tongue 15 inwardly, for instance by introducing a tool into the hollow space 10, so that the teeth 18 are disengaged from the indentations 12 of the pull strap 8. The pull strap 8 can then be pushed back without a problem so that the claws 7 lose their clamping function and the box 1 can be removed from the wall opening.

Figure 4:
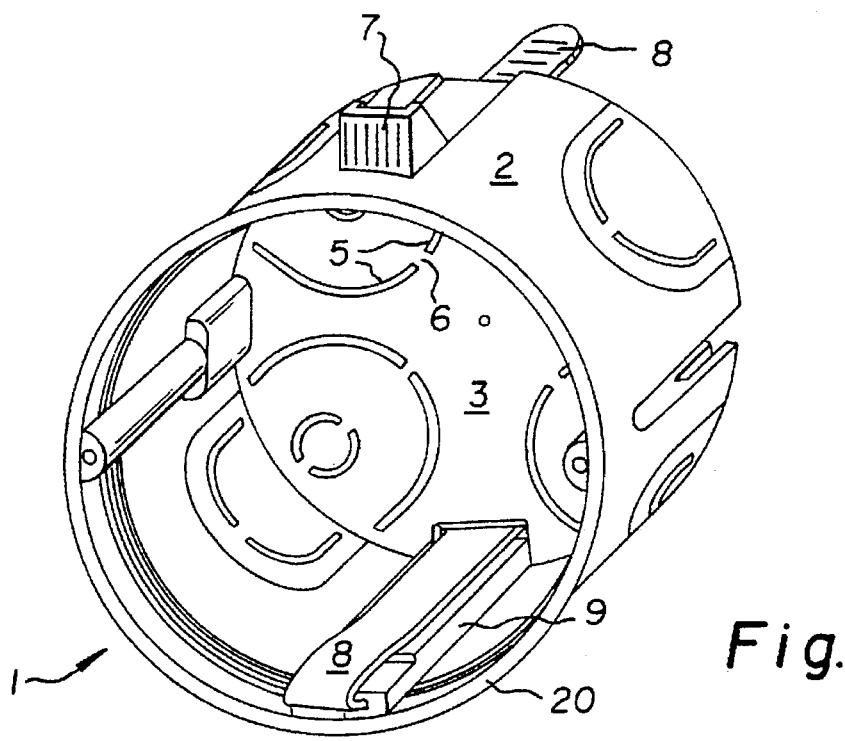
FIG. 4 is a similar view as FIG. 3 with the ends of the pull strap pushed through openings in the box bottom.

It is advantageous to form the pull straps 8 with substantially surplus length, so as to be able to form a sufficiently long row of the teeth of the toothing 11. This in turn enables mounting the box 1 in walls with widely varying thickness. The surplus length of the pull straps 8 can be cut off after mounting. In order to do away with this step, and to obviate the necessary severing tool, the embodiment of FIGS. 3 and 4 allows the surplus length of the straps 8 to be folded back into the inner space of the box 1 and, if necessary, to be pushed through the openings 21 in the bottom 3 of the box. The push-through openings 21 are suitably disposed immediately adjacent the respectively associated guide 9 and they are large enough to allow fitting insertion of the respective pull strap 8. It is necessary in this embodiment to form the pull straps 8 of tear-resistant but relatively bendable material. Plastic material which are suited therefor are commercially available.

The formation of the slits defining the push-through openings 21 in the vicinity of the guides 9 is advantageous in that the surplus lengths of the folded-over pull straps 8 essentially leave the inner space of the box 1 free, so as not to hinder the mounting of electrical assemblies, for instance a switch.

As noted above, the circular embodiments shown and described herein are exemplary only and the invention is not limited to the round embodiment.

I claim:

1. An electrical box assembly for mounting in walls, comprising:

a box defining an interior for receiving an electrical appliance and defining an axial direction thereof, said box having sidewalls and guides extending along said sidewalls in the axial direction;

a plurality of pull straps each shiftably guided in a respective one of said guides along the axial direction of the box, each of said pull straps carrying a claw for clamping said box in the wall; and each of said pull straps being formed with toothing and each of said guides being formed with counter toothing cooperating with said toothing of said pull straps, and each of said guides including a springy tongue carrying said counter toothing.

2. The electrical box according to claim 1, wherein each said springy tongue is formed by an inner wall portion of a respective said guide.

3. The electrical box according to claim 2, wherein the inner wall portion forming said springy tongue is integrally formed in one piece with said guide.

4. The electrical box according to claim 2, wherein the inner wall portion of said guide forming said springy tongue has a reduced wall thickness as compared with a remaining inner wall of said guide.

5. The electrical box according to claim 1, wherein said box has an open face end bounded by an edge, and said springy tongue is disposed at an end of said guide which neighbors said edge of said box.

6. The electrical box according to claim 1, wherein said guide is formed with slits extending in the axial direction, and said springy tongue is a tab which extends in the axial direction, which is separated from neighboring wall portions of said guide by said slits, and which merges into said guide at an end thereof facing away from an open face of said box.

7. The electrical box according to claim 1, wherein said toothing of said pull straps comprises teeth being inclined away from an open face of said box, and said counter toothing comprises teeth being inclined towards the open face of said box.

8. The electrical box according claim 1, wherein said toothing on the pull strap is a row of a multiplicity of teeth, and said counter toothing is formed by fewer teeth than the toothing on the pull strap.

9. The electrical box according claim 1, wherein said toothing on the pull strap is a row of a multiplicity of teeth, and said counter toothing is formed by two teeth.

10. The electrical box according to claim 1, wherein said springy tongue has a surface, and said counter toothing on said springy tongue is formed by teeth projecting from the surface of the tongue.

11. The electrical box according to claim 1, wherein said pull straps are formed of soft bendable material, and said box has a bottom formed with push-through openings for receiving a folded-back end of each said pull strap.

12. The electrical box according to claim 11, wherein said pull straps are formed of a tear-resistant plastic band.

13. The electrical box according to claim 11, wherein each of said push-through openings is formed immediately adjacent a respectively associated one of said guides.

* * * * *

UNITED STATES PATENT AND TRADEMARK OFFICE
CERTIFICATE OF CORRECTION

PATENT NO. : 5,628,419
DATED : May 13, 1997
INVENTOR(S) : Georg Putz

It is certified that error appears in the above-identified patent and that said Letters Patent is hereby corrected as shown below:

On the title page,
Item (30) should read as follows:

Nov. 4, 1994 (AT) Austria......A2052/94

Signed and Sealed this

Thirtieth Day of December, 1997

Attest:

BRUCE LEHMAN

Attesting Officer

Commissioner of Patents and Trademarks